United States Patent
Gildea

[15] 3,656,929
[45] Apr. 18, 1972

[54] FALLING FILM COOLING OF MOLTEN GLASS

[72] Inventor: Colin T. Gildea, Parbold near Wigan, England

[73] Assignee: Pilkington Brothers Limited, Liverpool, Lancashire, England

[22] Filed: May 12, 1969

[21] Appl. No.: 823,594

[30] Foreign Application Priority Data

May 29, 1968 Great Britain......................25,798/68

[52] U.S. Cl..................................65/129, 65/121, 65/134, 65/137, 65/162, 65/326
[51] Int. Cl. .......................................C03b 17/00
[58] Field of Search...................65/129, 326, 186, 203, 134, 65/137, 121, 128, 162, DIG. 4; 165/120

[56] References Cited

UNITED STATES PATENTS

| | | |
|---|---|---|
| 3,433,613 | 3/1969 | Dockerty..................................65/121 |
| 3,227,537 | 1/1966 | Novack....................................65/128 |
| 3,244,495 | 4/1966 | Apple......................................65/162 |
| 3,271,125 | 9/1966 | Lipp........................................65/129 |

Primary Examiner—S. Leon Bashore
Assistant Examiner—Richard H. Anderson
Attorney—Morrison, Kennedy & Campbell

[57] ABSTRACT

Molten glass is thermally conditioned by allowing it to run through a slit onto a metal film supporting member, such as a platinum plate or screen, the glass running into a falling curtain of glass running down the supporting member. The faces of the supporting member are enclosed within, opposed to and spaced from the radiant-heat absorbing walls of a chamber and are supported on a frame. The chamber walls having heating elements which are controlled to regulate the temperature of the walls and thereby control the temperature of the pool of molten glass collected at the bottom of the film supporting member.

9 Claims, 4 Drawing Figures

Inventor
COLIN THOMAS GILDEA

Inventor
COLIN THOMAS GILDEA

3,656,929

FALLING FILM COOLING OF MOLTEN GLASS

BACKGROUND OF THE INVENTION

This invention relates to the thermal conditioning of molten glass and more especially to the continuous thermal conditioning of molten glass for feeding continuously to a forming process, for example in the manufacture of glass fibres or optical glass.

It is a main object of the invention to provide an improved method and apparatus for continuously supplying a flow of thermally homogeneous molten glass, and this invention is based on the discovery that uniform thermal conditioning of a flow of molten glass can be effected in a downwardly falling curtain of molten glass when a curtain is maintained which is continuous across its width.

SUMMARY

According to the invention there is provide apparatus for thermally conditioning molten glass, comprising a duct connected to molten glass supply means, a slit in communication with the duct through which slit molten glass can fall, a film supporting member of a material wettable by molten glass extending downwardly from the slit, and so located that all glass falling through the slit runs into a falling curtain of glass running down said member, and means for effecting heat exchange with the falling curtain of glass to ensure substantial thermal homogeneity in the glass leaving the film supporting member.

Glass collected from the film may be caused to flow directly to a bushing in a glass fibre forming process or may be formed into a ribbon or strip form for example in the continuous manufacture of optical glass.

Further according to the present invention there is provided apparatus for thermally conditioning molten glass comprising a melting chamber, a duct leading from the melting chamber, said duct communicating with a slit through which a downwardly flowing curtain of molten glass may flow from the duct, a film supporting plate or mesh member extending downwardly from the said slit so that the downwardly flowing curtain immediately registers with top of the film supporting member and divides to form on each face of said member a thin downwardly flowing film of molten glass, said film supporting member being enclosed in a chamber having a top opening for passage of the said glass curtain to the screen, and comprising two cooling surfaces in juxtaposition to the two faces of the film supporting member, said chamber being adapted to permit controlled loss of heat by radiation from the downwardly flowing films, means for regulating the flow of molten glass downwardly through the slit and a receiver at the foot of the film supporting member for the conditioned glass leaving said member.

In one embodiment temperature sensitive means are provided within the receiver to regulate the amount of cooling of the downwardly flowing films.

Preferably the slit is a straight slit extending horizontally, and the film supporting member has an upper edge locating in and extending along the bottom of the slit.

In one embodiment the film supporting member is a mesh of platinum wire supported in a frame.

Electrical heating elements may be associated with the heat exchange means for maintaining the glass at a substantially uniform temperature across its width at any position on the film supporting member.

Further according to the present invention there is provided a method of thermally conditioning molten glass, comprising pouring molten glass through a slit on to a plate or mesh screen film supporting member of a material wettable by molten glass to form a continuous falling curtain of glass running down said member, and effecting controlled loss of heat by radiation from the downwardly flowing glass to two cooling surfaces of a chamber which are in juxtaposition to the two faces of the member by controlling the temperature of said cooling surfaces.

In one preferred method the said surfaces are provided on respective walls of the chamber which have electrical heating elements embodied therein, the electrical heating elements being regulated to control the temperature of said surfaces and thereby to maintain the glass film at a substantially uniform temperature across its width at any position on the film supporting member.

In another preferred method the molten glass leaving the film supporting member passes into a receiver, and temperature sensitive means are associated with the receiver and regulate the cooling of the downwardly flowing glass by controlling the temperature of said cooling surfaces.

The film supporting member need not necessarily be planar and the slit need not necessarily be straight: for example molten glass may flow over a circular weir formed in the floor of the forehearth and down the outer face of a film supporting member of cylindrical form, there being means within the cylindrical member for effecting the desired thermal conditioning of the falling film of glass.

In addition to the cooling by absorption of heat radiated from the falling curtain glass localized heating may be effected, for example in order to expel dissolved gas from the molten glass, and for this purpose electrical heating elements may be incorporated in the film supporting member.

DESCRIPTION OF THE PREFERRED EMBODIMENT

Figure 1:
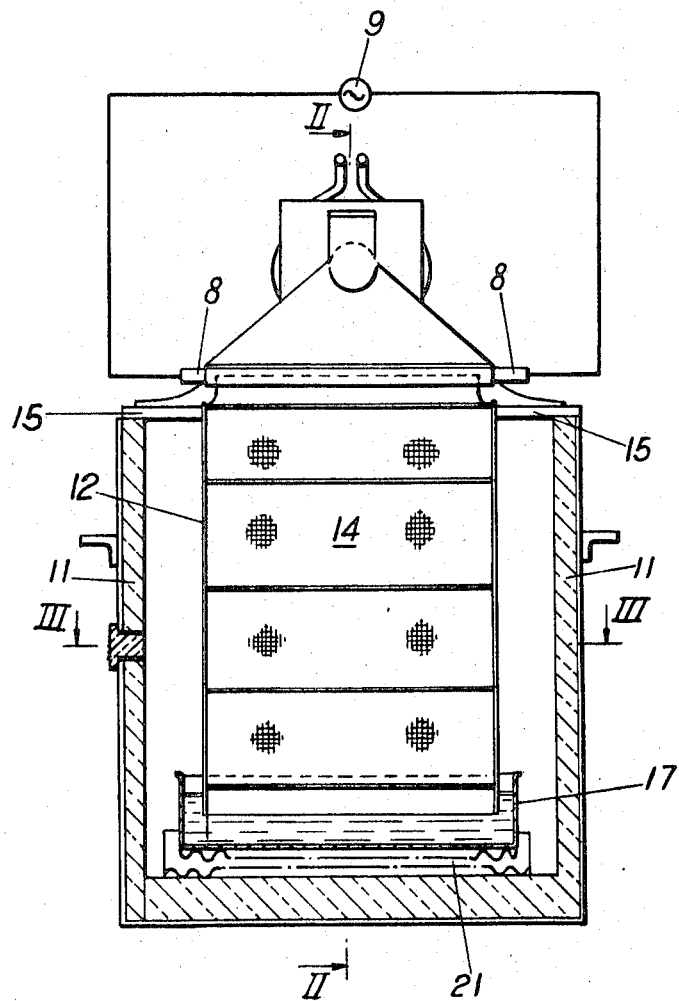
FIG. 1 is a sectional elevation, by way of example, through apparatus for conditioning molten glass according to the invention with the front wall of the apparatus removed.
Figure 2:
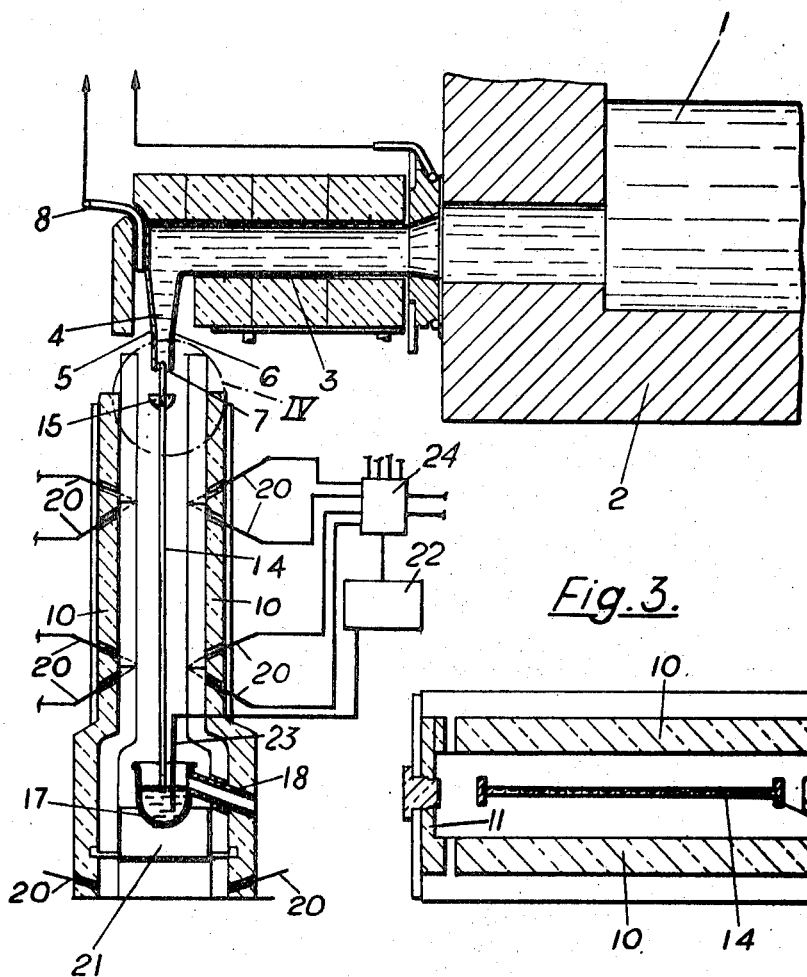
FIG. 2 is a section on line II—II of FIG. 1.
Figure 3:
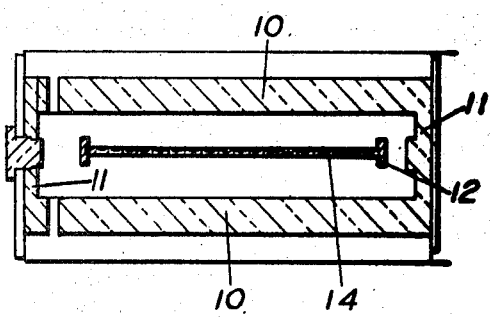
FIG. 3 is a section on line III—III of FIG. 1.
Figure 4:
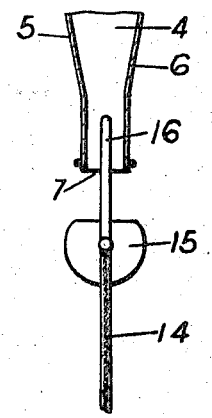
FIG. 4 is an enlarged cross sectional view of the part of the apparatus enclosed within the chain-dotted circle IV of FIG. 2.

Referring to FIGS. 1 and 2 of the drawings molten glass 1 flows from a side exit in a forehearth 2 of a glass melting furnace (which furnace is not shown) through a heated thermally insulated tube 3 formed of platinum or a refractory alloy. The tube 3 communicates with a downwardly extending duct 4 formed between two downwardly converging walls 5, 6 (FIGS. 2 and 4). The duct 4 terminates at its lower end in a horizontal downwardly facing slit 7. The walls 5, 6 are also formed of platinum or a refractory alloy. Electrical contacts 8 are attached to the walls 5, 6 at opposite ends of the slit 7 and a controlled electric current is passed between the contacts from an alternating current source indicated diagrammatically at 9 to maintain a predetermined feed temperature of the glass flowing through the slit 7.

Mounted below the slit 7 is a chamber defined by thermally insulated front and rear walls 10 (FIG. 2) and end walls 11 (FIG. 1). This chamber is of elongated rectangular cross-section, and supported within the chamber there is a frame 12 over which is extended a film supporting member comprising a laminar plate or mesh 14 of platinum or platinum alloy. The frame 12 carrying the plate or mesh 14 is supported near its upper edge by side stubs 15 which rest on adjustable supports (not shown) fixed to the end walls 11 of the chamber. An upper portion 16 of the plate or mesh 14 is located within the slit 7 as shown in FIG. 4 and by raising or lowering of the frame 12 carrying the plate or mesh 14 by means of the stubs 15 the portion 16 moves up or down within the slit 7, thereby controlling the rate of the flow of molten glass downwardly through the slit 7 and over the plate or mesh 14. The rate of flow of molten glass through the slit 7 is, for example 200 kg. per hour and the glass flowing through the slit is at an initial temperature in the range 1,250° to 1,300° C.

All the glass falling through the slit 7 runs into a descending curtain of glass which runs down both sides of the plate or mesh 14. This falling curtain of molten glass is constituted by a thin film of molten glass on each side of the plate or mesh 14 having a total thickness of from 5 to 10 mm. The molten glass wets on to the plate or mesh 14 and the width of the curtain is consequently maintained continuous through its fall, thereby providing the possibility of uniform thermal treatment of the whole of the molten glass which runs through the slit 7.

The bottom edge of the frame 12 carrying the plate or mesh 14 dips into a receiver 17 for the molten glass. The receiver 17 is made of a suitable material, preferably platinum, and the glass falling from the plate or mesh 14 into the receiver 17 is channelled through an outlet 18 extending from the side of the receiver 17, downwardly through one of the walls 10 of the chamber. This outlet may be for example lead directly into the bushing of a glass fibre drawing plant.

Within the thermally insulated walls 10 of the chamber there are inserted electrical heating elements 20 arranged so that the walls, which have cooling surfaces facing the glass, may be maintained at predetermined temperatures, controlled by varying the electrical input to the elements 20, for effecting a desired rate of radiative heat transfer from the glass.

The receiver 17 is supported on the floor of the chamber by a corrugated support member 21 which is designed to minimize heat loss from the receiver 17 by conduction. Such heat loss may be compensated by heating the support member 21 from below.

The front and rear walls 10 of the chamber act in effect as a heat sink which absorbs heat radiated from the downwardly falling film of molten glass. Because the thickness of this film is relatively small the radiative heat loss to the surfaces of the walls 10 results in a substantially thermally homogeneous glass by the time the glass reaches the receiver 17.

The cooling surfaces of the walls 10 are made of refractory material of sufficient thickness to permit heat to be lost from the glass at a rate slightly in excess of the desired rate of heat loss. This enables the actual rate of heat loss to be brought under positive control by suitable regulating the heat supplied to the walls 10 by the heating elements 20 so as to compensate for this excess heat loss.

Conveniently the heating elements 20 may be arranged in a number of vertical banks so as to permit separate control of each bank of heating elements.

Temperature control is effected by means of a control circuit employing a comparator 22 which compares the actual temperature of the molten glass in the receiver 17 as sensed by a thermocouple 23 with a pre-set temperature and having a supply controller 24 which provides an output signal to vary the electrical input to the heating elements 20.

In one example of a method according to the invention glass is falling through the slit 7 at the rate of 200 kg. per hour and at a temperature of 1,250° C. The glass cools during its fall as a curtain formed on the plate or mesh 14 to a temperature of about 1,150° = 5° C. at which temperature the glass is supplied from the receiver 17 to a forming process. The length of the slit 7 in this case is 38 cms. and the vertical depth of the duct 4 is 49 cms. The temperature of the cooling surfaces of the walls 10 is maintained at about 1,150° C., and the films of molten glass formed on both faces of the plate or mesh 14 are each approximately 0.35 cm. thick. The total area of each film of molten glass is approximately 30 ± 45 cm. and each wall 10 has a cooling surface with an effective heat transfer area of 1.35 square meters.

Thus the method and apparatus according to the invention provides a very compact construction for thermally conditioning molten glass at the flow rate required on the manufacture of glass fibers or optical glass. Temperature gradients are substantially eliminated in the molten glass, which is collected in the reservoir and is at a substantially uniform temperature. The avoidance of contact with the usual refractory materials throughout this thermal conditioning improves the quality of the ultimate glass produced.

The apparatus may be employed additionally for the elimination of dissolved gases from the molten glass when an electric heater is embodied in the plate or mesh 14 extending across a small part of the total height of the latter. In order to assist the elimination of any gas bubbles from the glass the plate or mesh 14 carried in its frame 12 may slope at a slight angle which would not detract from the desired uniform formation of the curtain of downwardly flowing molten glass on the plate or mesh but would permit ready escape of any dissolved gases which come out of solution as the curtain passes over the heated section of the plate or mesh.

I claim:

1. Apparatus for thermally conditioning molten glass, comprising a duct connected to molten glass supply means, a slit communicating with the duct through which slit molten glass can fall, a thermally-insulating chamber mounted below the duct which chamber has radiant-heat absorbing walls, a film supporting member of laminar form and of a metal wetted by molten glass extending downwardly in the chamber from the slit, said chamber enclosing the film-supporting member, means for locating said liminar film supporting member with the faces of the member opposed to and spaced from opposite radiant-heat absorbing walls of said chamber, means to direct all glass falling through the slit into a falling curtain of glass running down said both faces of said laminar member, heating means in said chamber walls, and control means connected to said heating means to regulate the temperature of said walls and thereby control absorption of radiant heat from said falling curtain of glass.

2. Apparatus for thermally conditioning molten glass comprising a melting chamber, a duct leading from the melting chamber, a slit communicating with said duct through which slit a downwardly flowing curtain of molten glass may flow from the duct, a film supporting member of laminar form and of a metal wetted by molten glass extending downwardly from the said slit so that the downwardly flowing curtain immediately registers with the top of the film supporting member and divides to form on each face of said laminar member a thin downwardly flowing film of molten glass, a chamber enclosing said film supporting member which chamber is formed with a top opening for passage of the said glass curtain to said film supporting member and has two radiant-heat absorbing walls opposed to, spaced from, and parallel to the two faces of the laminar film supporting member, means for regulating the flow of molten glass downwardly through the slit, heating means in said chamber walls, control means connected to said heating means to regulate the temperature of said walls and thereby control absorption of radiant heat from the molten glass film, and a receiver at the foot of the film supporting member for the conditioned glass leaving said member.

3. Apparatus according to claim 2, including temperature sensitive means within the receiver and connected to said control means to regulate the amount of cooling of the downwardly flowing films.

4. Apparatus according to claim 1, wherein the slit is a straight slit extending horizontally, and the film supporting member has an upper edge located in and extending along the bottom of the slit.

5. Apparatus according to claim 1, wherein the film supporting member is a mesh of platinum wire supported in a frame.

6. Apparatus according to claim 1, including electrical heating elements in said chamber walls.

7. A method of thermally conditioning molten glass, comprising pouring molten glass through a slit on to a laminar film supporting member of a metal wettable by molten glass to form a continuous falling curtain of glass running down the faces of said member, uniformly absorbing radiant heat from the faces of said curtain of glass by radiation absorption surfaces opposed to, spaced from, and parallel to said curtain, and controlling the temperature of those surfaces to regulate the rate of heat loss by radiation from both faces of the curtain and thereby ensure substantial thermal homogeneity in the glass leaving said curtain.

8. A method according to claim 7, including regulating electrical heating elements associated with said radiation absorption surfaces to control the temperature of said surfaces and thereby to maintain the glass at a substantially uniform temperature across its width at any position on the film supporting member.

9. A method according to claim 7, including catching the molten glass leaving the film supporting member in a receiver, sensing the temperature of the glass in the receiver and employing an indication of the sensed glass temperature to control the temperature of said cooling surfaces.

* * * * *